United States Patent
D'Agostino

(10) Patent No.: US 9,565,868 B2
(45) Date of Patent: *Feb. 14, 2017

(54) APPARATUS AND METHOD FOR DISPENSING FROZEN CONFECTIONS

(71) Applicant: Conopco, Inc., Englewood Cliffs, NJ (US)

(72) Inventor: Tommaso D'Agostino, Rushden (GB)

(73) Assignee: CONOPCO, INC., Englewood Cliffs, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/394,363

(22) PCT Filed: Apr. 8, 2013

(86) PCT No.: PCT/EP2013/057331
§ 371 (c)(1),
(2) Date: Oct. 14, 2014

(87) PCT Pub. No.: WO2013/156336
PCT Pub. Date: Oct. 24, 2013

(65) Prior Publication Data
US 2015/0144654 A1    May 28, 2015

(30) Foreign Application Priority Data
Apr. 16, 2012 (EP) .................. 12164310

(51) Int. Cl.
*A23G 9/28* (2006.01)
*A23G 9/22* (2006.01)
*A23G 9/30* (2006.01)

(52) U.S. Cl.
CPC ............... *A23G 9/28* (2013.01); *A23G 9/227* (2013.01); *A23G 9/30* (2013.01)

(58) Field of Classification Search
CPC ........... A23G 9/28; A23G 9/227; A23G 9/30; B67D 1/0868
See application file for complete search history.

(56) References Cited

U.S. PATENT DOCUMENTS 1,685,250 A    9/1928    Key
2,950,606 A    8/1960    Maddux
(Continued)

FOREIGN PATENT DOCUMENTS

EP    0596722    5/1994
EP    1186239    3/2002
(Continued)

OTHER PUBLICATIONS

Search Report in EP12164310, Sep. 26, 2012.
(Continued)

*Primary Examiner* — Nicholas J Weiss
(74) *Attorney, Agent, or Firm* — Foley & Lardner LLP

(57) ABSTRACT

An apparatus (1) for dispensing a frozen confection is provided comprising: an insulated chamber (2) housing a container (3) of a frozen confection; a refrigeration system (8); a nozzle (4) having an inner end which is connected to the container (3); and an outer end which is located outside the insulated chamber (2); means for applying pressure to the frozen confection thereby to dispense it from the container (3); a cap (7) which can enclose the outer end of the nozzle (4) when closed and which allows external access to the outer end of the nozzle (4) when open; and one or more channels which allow cold air to flow from the chamber (2) into the region around the outer end of the nozzle (4).

2 Claims, 3 Drawing Sheets

(56) References Cited

U.S. PATENT DOCUMENTS

| | | | | |
|---|---|---|---|---|
| 3,656,316 | A * | 4/1972 | Stock | A23G 9/281 |
| | | | | 62/306 |
| 5,405,054 | A | 4/1995 | Thomas | |
| 6,616,011 | B2 * | 9/2003 | Derry | B67D 1/0868 |
| | | | | 222/1 |
| 9,241,501 | B2 * | 1/2016 | Broadbent | A23G 9/28 |
| 2006/0255066 | A1 | 11/2006 | Kannar et al. | |

FOREIGN PATENT DOCUMENTS

| | | |
|---|---|---|
| GB | 2318839 | 5/1998 |
| WO | WO2007039158 | 4/2007 |

OTHER PUBLICATIONS

Search Report in PCTEP2013057331, Jul. 19, 2013.
Written Opinion in EP12164310, Sep. 26, 2012.
Written Opinion in PCTEP2013057331, Jul. 19, 2013.

\* cited by examiner

APPARATUS AND METHOD FOR DISPENSING FROZEN CONFECTIONS

TECHNICAL FIELD

This invention relates to an apparatus and method for dispensing frozen confections, such as soft ice cream.

BACKGROUND

Soft ice cream is normally dispensed at the point of sale from a soft serve ice cream machine, i.e. a semi-continuous, pressurised scraped surface heat exchanger in which a pre-packaged mix is frozen and aerated. It is typically dispensed at temperatures of −4 to −8° C., for example into a cone, and is then immediately consumed. It is liked by many consumers because of its texture, which is softer than that of ice cream served by scooping from a container kept in a freezer cabinet at around −18° C. Soft serve ice cream machines have a number of disadvantages: they are large and expensive, require training to operate, consume considerable energy, do not deliver consistent product quality if used over a period of time and are inconvenient for the operator to dismantle and clean. Each machine can also only offer one type of product (e.g. flavour/ice cream/sorbet etc) at a time—separate freezer barrels are required for different products.

In recent years, systems for dispensing soft ice cream have been developed in which pre-packaged ice cream is delivered from a container by a dispensing apparatus. U.S. 2006/255066 discloses a dispensing apparatus containing a pressure-displacement device that forces the food (such as soft ice cream) out of its container. The container is located within a chamber which keeps the ice cream at a specified temperature between −6 and −24° C. The chamber is cooled with a compressor refrigeration system that sends refrigerant through the walls of the chamber. A fan may be included with the refrigeration system to help circulate air.

One of the issues inherent to apparatus for dispensing multiple portions of ice cream from a single container is to ensure that the system is hygienic. In particular, whilst it is generally straightforward to keep the frozen confection stored within the dispensing apparatus at a sufficiently low temperature, the nozzle or passage through which the frozen confection flows during dispensing must be open to the outside, at least during the dispensing operation. Therefore there is a potential hygiene issue arising from small amounts of frozen confection being retained within the nozzle and being subjected to higher temperatures, which could result in microbial growth. In U.S. 2006/255066, this problem is in part addressed by making the outlet an integral part of the container which holds the ice cream, so that the valve which controls the flow acts on the outlet portion and does not come into direct contact with the frozen confection. However while this avoids the issue of the contact between the valve and the frozen confection, there still remains the problem of microbial growth on any frozen confection which has remained within the outlet where it is not kept at a low enough temperature.

U.S. Pat. No. 2,950,606 discloses a system for dispensing ice cream having a door hinged to the cabinet which covers the outlet through which the ice cream is dispensed. The door is closed when ice cream is not being dispensed. Cold air is blown through a duct into the region around the outlet through which ice cream is dispensed by a blower. The cold air is said to ensure that the dispensing part of the system is kept free from an accumulation of melted ice cream. However, the outlet still requires cleaning, and moreover the system requires a permanent duct to be provided through which cold air is blown from the main refrigerated body of the apparatus to the outlet.

Thus there remains a need for an improved system for dispensing frozen confections such as soft ice cream.

BRIEF DESCRIPTION OF THE INVENTION

We have now developed an apparatus and method which overcomes the problems of previous dispensers. Accordingly, in a first aspect, the present invention provides an apparatus for dispensing a frozen confection, the apparatus comprising:

an insulated chamber, which houses at least one container suitable for containing a frozen confection;

a refrigeration system for cooling the chamber and its contents to a temperature of −6° C. or below;

a nozzle having an inner end which is connected to the container and which is located inside the insulated chamber; and an outer end which is located outside the insulated chamber;

means for applying pressure to the frozen confection thereby to urge the frozen confection from the container into the inner end of the nozzle, through the nozzle, and out through the outer end of the nozzle thereby dispensing the frozen confection;

a cap which can move between a closed position, wherein the outer end of the nozzle is enclosed between the cap and the outside of the chamber, and an open position which allows external access to the outer end of the nozzle; and one or more channels which allow cold air to flow from the chamber into the region around the outer end of the nozzle which is enclosed by the cap when it is in the closed position;

characterised in that the means for applying pressure comprise a pressurized tank connected to the at least one container by at least one conduit, the pressurized tank being located outside the insulated chamber, said at least one conduit having an inner end which is connected to the container and which is located inside the insulated chamber; and an outer end which is located outside the insulated chamber and which is connected to the pressurised tank, the pressurised tank being equipped with means to discharge the water contained in the pressurised tank;

the conduit being equipped with heating means.

The discharging means in the pressurised tank prevent the built up of humidity in the tank (coming from the compression of atmospheric air by means not represented). This therefore decreases the transfer of humidity to the conduit connecting the pressurised tank and the container. This has been found to significantly decrease the built up of ice in the part of this conduit which is located inside the insulated chamber. Preferably the discharge takes place automatically.

The heating means, prevent the formation of ice in the conduit and melt any ice which could have form. In a preferred embodiment, the heating means comprise a coil inside an insulated sleeve around the conduit, the coil being heated by electrical current.

Preferably also a non return valve on the conduit stops inflow of humid air sucked into the air supply tubes to the bottle, between dispensing cycles.

Preferably, the apparatus comprises a removable holder that supports the container and wherein the spaces between the container, the inside of the chamber and the underside of the holder form the one or more channels.

The removable holder has the advantage that it can be easily removed by the operator, cleaned and replaced.

Preferably the refrigeration system cools air which is circulated around the container in the chamber. Preferably the refrigeration system is capable of maintaining the chamber and its contents to a temperature of below −12° C., preferably below −15° C.

Preferably the outer end of the nozzle is kept at a temperature below −13° C. when the cap is in its closed position.

Preferably there are at least two channels between the chamber and the region around the outer end of the nozzle which is enclosed by the cap.

Preferably one or more fans, most preferably axial fans, are located in the channels.

Preferably the holder has protrusions which support the container above the holder, so that the spaces between the container and the holder form channels.

Preferably also the holder has protrusions which support the holder above the inside of the insulated chamber, so that the spaces between the holder and the chamber form channels.

In a second aspect, the present invention provides a method for dispensing a frozen confection, the method comprising:
  providing an apparatus according to the first aspect of the invention;
  placing a container containing a frozen confection inside the chamber;
  placing the cap in its open position; and
  applying pressure to the frozen confection thereby urging it from the container into the inner end of the nozzle, through the nozzle, and out through the outer end of the nozzle thereby dispensing the frozen confection.
Preferably the frozen confection is ice cream.

DETAILED DESCRIPTION OF THE INVENTION

The present invention will now be described with reference to the figures, wherein.

Figure 1:
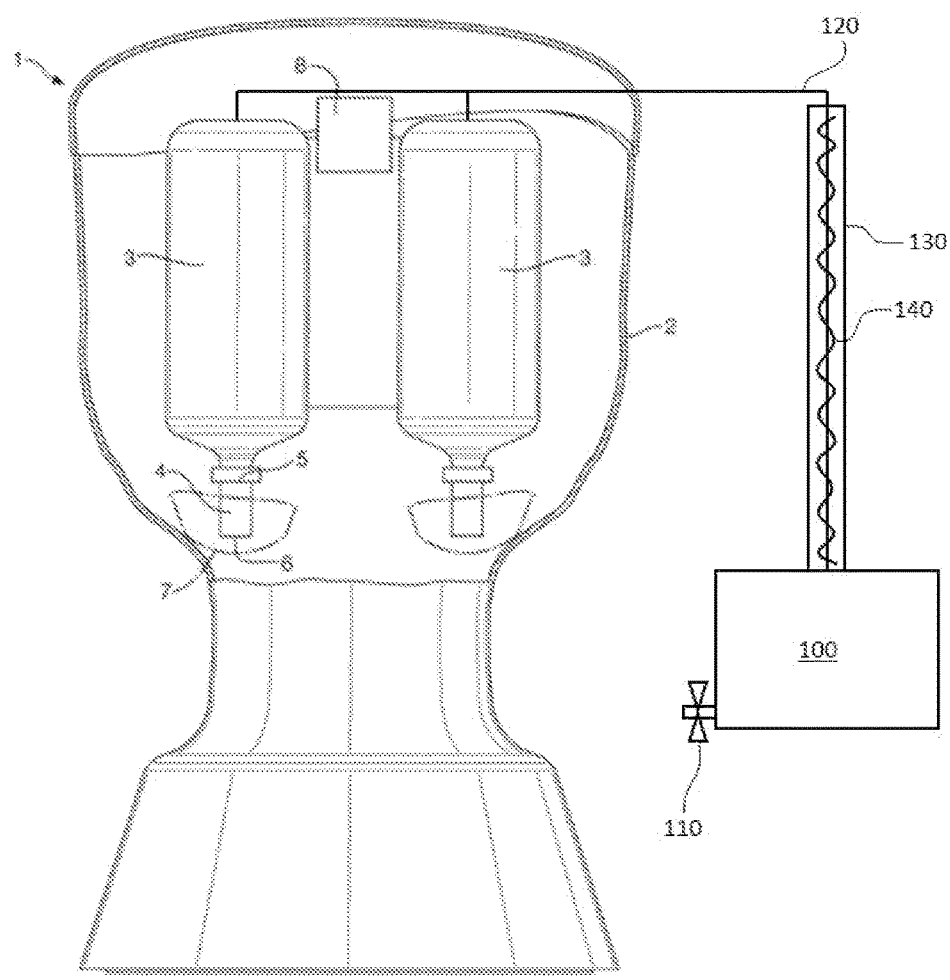
FIG. 1 shows an apparatus according to the invention.

The apparatus 1 comprises an insulated chamber 2, which houses one or more containers 3 of a frozen confection such as ice cream. In the embodiment shown in FIG. 1 there are two such containers. A refrigeration system 8 cools the chamber and its contents to a temperature of −12° C. or below. The refrigeration system is typically a conventional such system, having a compressor, cooling coils and a fan for circulating the cooled air. The refrigeration system is designed to allow cold air to flow around the container in the insulated chamber, in order to keep the ice cream at the correct temperature (e.g. −18° C.). The apparatus also comprises means for applying pressure to the frozen confection thereby to urge the frozen confection from the container (not shown in FIG. 1).

The insulated chamber 2 is a chamber having insulated walls which preferably comprise a heat insulating material having a thermal conductivity in the range of 0.5 to 50 mWm$^{-1}$K$^{-1}$. Typically, the container has 6 sides (top, bottom, front, back, left and right), with rounded faces, edges and corners, although other shapes and configurations are possible. The insulated walls may be constructed from an insulating material encased between sheets of a material such as fibreglass, metal or plastic. The insulating material can be, for example, a closed cell foam structure such as expanded polystyrene; foam rubber, such as elastomeric nitrile rubber insulation (which has a thermal conductivity of around 30 mW m$^{-1}$K$^{-1}$); rigid foams, such as polyurethane; a fibrous material, such as fibreglass; a vacuum sealed within a double walled container; or vacuum insulated panels, which are typically made of an open cell foam or granular structure which is enveloped and hermetically sealed into a gas-impervious film under very low pressure. These panels have a thermal conductivity of around 5 to 10 mW m$^{-1}$K$^{-1}$. Different insulating materials can be used to construct different parts of the container. The walls are usually 5-50 mm thick, typically about 25 to 50 mm. Preferably the containers 3 are "bag in bottle" containers, where the frozen confection is located in a flexible bag inside a rigid bottle. The pressure is applied to the frozen confection by increasing the pressure of the gas in the region outside the bag but inside the bottle. In this way pressure is applied all around the bag which contains the frozen confection, such that the force on the frozen confection is substantially directed towards the outlet. This results in very little frozen confection being wasted by becoming trapped in the container and also provides good control over the dispensing rate, compared for example to a system wherein pressure is applied to the frozen confection by means of a piston located at the end of a cartridge opposite to the outlet. WO 07/039158 describes this type of container. The pressure may be applied only during dispensing, for example by using an external source of compressed air such as a pump.

Figure 2:
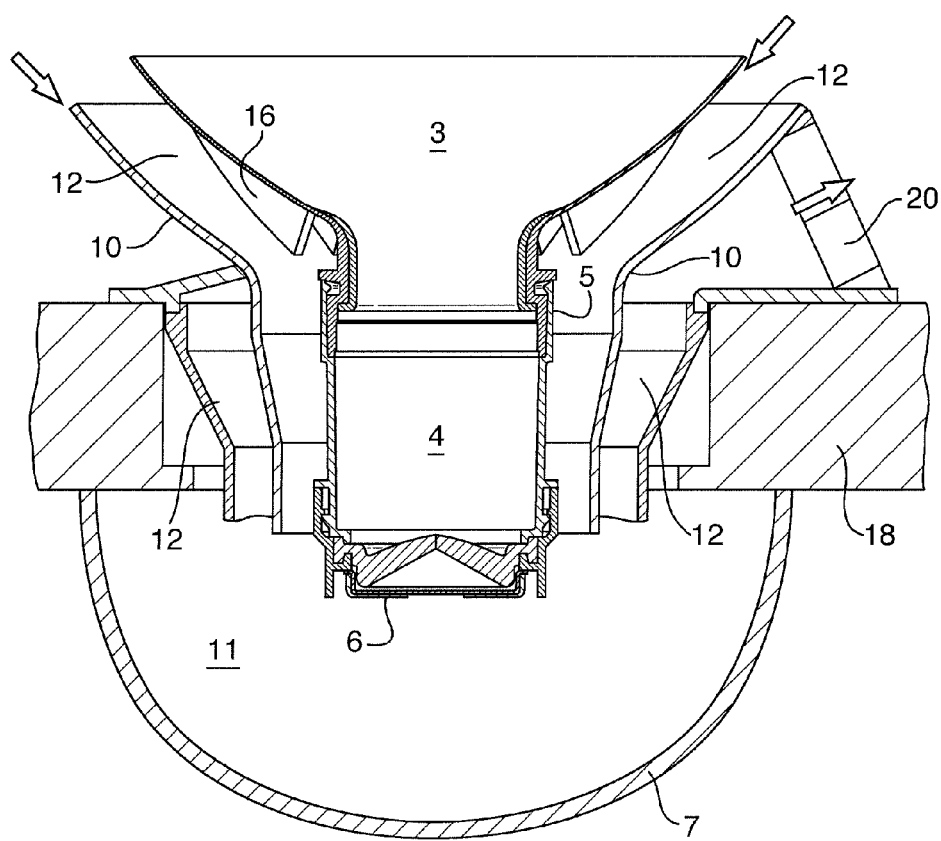
FIG. 2 shows an enlarged view of the removable holder supporting the container of frozen confection in place in the apparatus of FIG. 1.

A nozzle 4 is attached to each container. As shown in FIG. 2, the inner end 5 of the nozzle is connected to the container 3 and is located inside the insulated chamber. The outer end 6 of the nozzle is located outside the insulated chamber. A cap 7 can move between a closed position, wherein the outer end of the nozzle is enclosed between the cap and the outside of the chamber, and an open position which allows external access to the outer end of the nozzle. In FIGS. 1 and 2 the cap is shown in the closed position. As shown in FIG. 2 the cap 7 thus closes a region 11 around the outer end of the nozzle. The cap 7 is designed to minimise heat ingress into this region. Preferably the inside of the cap comprises a layer of insulating material and has a gasket (e.g. made from silicone) which seals the cap against the outside of the chamber when the cap is in the closed position and therefore prevents air flow into the enclosed region around the end of the nozzle, thus keeping it cold.

As shown in FIG. 2, the containers 3 are supported and located in place by a removable holder 10. The holder is shaped so as to define spaces 12 between the inside of the bottom side 18 of the chamber 2 and the lower side of the holder 10, and/or between the container 3 and the upper side of the holder 10. These spaces form the channels 12 which allow cold air to flow from the chamber into the region 11 around the outer end 6 of the nozzle 4 which is enclosed by the cap 7 when it is in the closed position. This ensures that the nozzle area is kept cold enough to prevent the frozen confection from warming up and ensures that the ice cream is safe to eat when it has been dispensed. There are preferably at least two channels 12 between the chamber and the region 11 around the outer end of the nozzle which is enclosed by the cap.

In a preferred embodiment, the nozzle has a self-closing valve at its outer end. Preferably the self-closing valve is formed from a slit valve, i.e. a piece of resilient material (such as silicone rubber) which has two or more slits which cross each other. The resilient nature of the material has the result that a threshold pressure is required to open the slits, allowing the frozen confection to flow out. Once the pressure is removed, the valve closes itself. The slit valve is preferably from 1 to 4 cm in diameter, more preferably about 3 cm. We have found that the temperature in the area around the outer end of the nozzle should be −13° C. or below (when the cap is in its closed position). This prevents ice cream leaking out from the slit valve.

Figure 3:
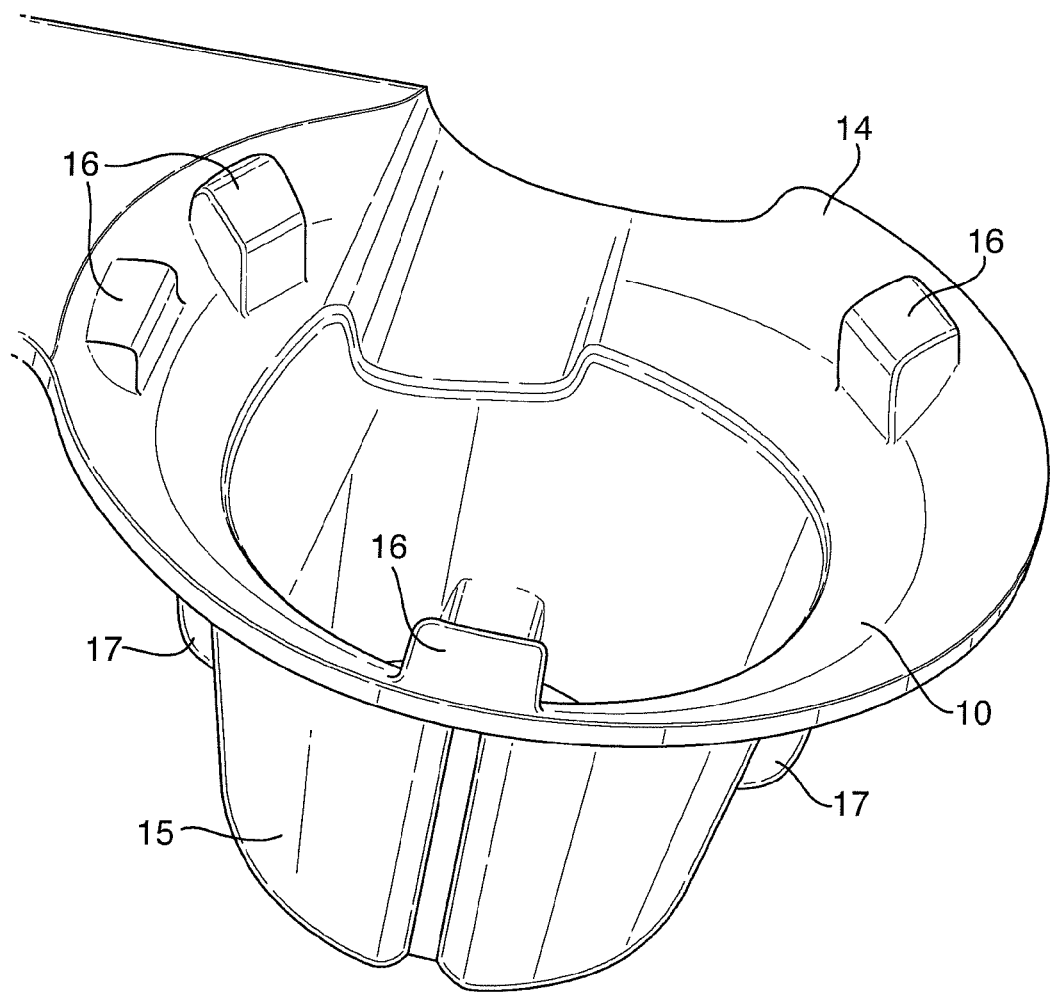
FIG. 3 shows the holder separately from the rest of the apparatus.

FIG. 3 shows a preferred embodiment of the holder (shown separately from the rest of the apparatus). The space between the container and the holder forms one or more channels for the air to go into the region around the end of the nozzle, and the space between the holder and the inside of the chamber forms one or more channels for air to flow out. The holder 10 is generally tubular. The upper section 14 of the holder is preferably flared in order to receive the shoulder of the container which is preferably bottle-shaped. The lower section 15 of the holder is generally cylindrical, although it may taper towards its lower end. It is sized to accommodate the nozzle 4, as shown in FIG. 2. The holder has protrusions 16 on the inside of the flared upper section 14 on which the shoulder of the bottle rests. These protrusions 16 support the bottle above the inside of the upper section 14, and thereby leave spaces between the bottle and the holder which form channels. Similarly there are also protrusions 17 on the outside of the lower section 15 of the holder which rest on the inside of the bottom of the insulated chamber. These protrusions 17 support the holder 10 above the inside of the insulated chamber 2, and thereby leave spaces between the holder and the chamber which also form channels. The protrusions 16, 17 may take any suitable form such as platforms or ridges. In the preferred embodiment shown in FIG. 3, the protrusions 16 on the inside of the flared upper section are in the form of small platforms and the protrusions 17 on the outside of the lower section are in the form of ridges. By using protrusions on the holder to form the channels, air flow to the nozzle area is achieved whilst using only simple mouldings.

A major advantage of the present invention is that the holder 10 is removable from the apparatus. This allows the holder to be easily removed by the operator, cleaned and replaced for example when changing containers, thus avoiding potential microbial growth.

As shown in FIG. 2, in a preferred embodiment, a fan 20 is located in one of the channels. The fan 20 pulls the air from the chamber 2 through channel(s) 12 into the region 11 around the outer end of the nozzle, thereby increasing the flow of cold air into this area and keeping the outer end of the nozzle at or below the required temperature. The arrows in FIG. 2 indicate the directions of the airflow. There may be a plurality of such fans in the channels, for example some of the channels contain fans whereas others do not. Having a plurality of channels increases the flow of cold air to and from the region around the outer end of the nozzle. The fan helps to keep the region around the outer end of the nozzle cold, especially immediately after dispensing when this region contains warm air which entered from outside when the cap was open during dispensing. Without the fan, the warm air could simply sit in this region, thereby warming the nozzle. The fan ensures that this region is quickly filled with cold air after the cap has been closed.

The channels 12 are sized and shaped so that the pressure drop provided by the fan results in a sufficiently high air flow rate through the channels to achieve the desired cooling of the outer end of the nozzle. In general the larger the cross-sectional area of the channel, the lower the pressure drop required to achieve sufficient air flow. Preferably the fan(s) is an axial fan. Axial fans are capable of producing high air flow rates provided that the pressure drop is low. They are generally cheaper than other fans that are capable of creating air flow with a larger pressure drop in the channel (e.g. centrifugal fans).

The various features of the embodiments of the present invention referred to in individual sections above apply, as appropriate, to other sections mutatis mutandis. Consequently features specified in one section may be combined with features specified in other sections as appropriate. Various modifications of the described modes for carrying out the invention which are apparent to those skilled in the relevant fields are intended to be within the scope of the following claims.

The invention claimed is:

1. An apparatus for dispensing a frozen confection, the apparatus comprising:
   an insulated chamber, which houses at least one container suitable for containing a frozen confection;
   a refrigeration system for cooling the chamber and its contents to a temperature of −6° C. or below;
   a nozzle having an inner end which is connected to the container and which is located inside the insulated chamber; and an outer end which is located outside the insulated chamber;
   means for applying pressure to the frozen confection thereby to urge the frozen confection from the container into the inner end of the nozzle, through the nozzle, and out through the outer end of the nozzle thereby dispensing the frozen confection;
   a cap which can move between a closed position, wherein the outer end of the nozzle is enclosed between the cap and the outside of the chamber, and an open position which allows external access to the outer end of the nozzle; and
   one or more channels which allow cold air to flow from the chamber into a region around the outer end of the nozzle which is enclosed by the cap when it is in the closed position;
   characterised in that the means for applying pressure comprise a pressurized tank connected to the at least one container by at least one conduit, the pressurized tank being located outside the insulated chamber, said at least one conduit having an inner end which is connected to the container and which is located inside the insulated chamber; and an outer end which is located outside the insulated chamber and which is connected to the pressurised tank,
   the pressurised tank being equipped with means to discharge water contained in the pressurised tank;
   the conduit being equipped with heating means.

2. A method for dispensing a frozen confection, the method compromising:
   providing an apparatus for dispensing a frozen confection, the apparatus compromising:
   an insulated chamber, which houses at least one container suitable for containing a frozen confection;
   a refrigeration system for cooling the chamber and its contents to a temperature of −6° C. or below;
   a nozzle having an inner end which is connected to the container and which is located inside the insulated chamber; and an outer end which is located outside the insulated chamber;
   means for applying pressure to the frozen confection thereby to urge the frozen confection from the container into the inner end of the nozzle, through the nozzle, and out through the outer end of the nozzle thereby dispensing the frozen confection;

a cap which can move between a closed position, wherein the outer end of the nozzle is enclosed between the cap and the outside of the chamber, and an open position which allows external access to the outer end of the nozzle; and one or more channels which allow cold air to flow from the chamber into a region around the outer end of the nozzle which is enclosed by the cap when it is in the closed position;

the means for applying pressure comprising a pressurized tank connected to the at least one container by at least one conduit, the pressurized tank being located outside the insulated chamber, said at least one conduit having an inner end which is connected to the container and which is located inside the insulated chamber; and an outer end which is located outside the insulated chamber and which is connected to the pressurised tank, the pressurised tank being equipped with means to discharge water contained in the pressurised tank;

the conduit being equipped with heating means;

placing a container containing a frozen confection inside the chamber;

placing the cap in its open position; and applying pressure to the frozen confection thereby urging it from the container into the inner end of the nozzle, through the nozzle, and out through the outer end of the nozzle thereby dispensing the frozen confection.

* * * * *